(No Model.) 4 Sheets—Sheet 1.
H. S. McKAY.
MEANS FOR GIVING RECIPROCATING OR OTHER MOTIONS.
No. 498,721. Patented May 30, 1893.

WITNESSES. INVENTOR.
Henry S. McKay
by John J. Halsted & Son
his Attys.

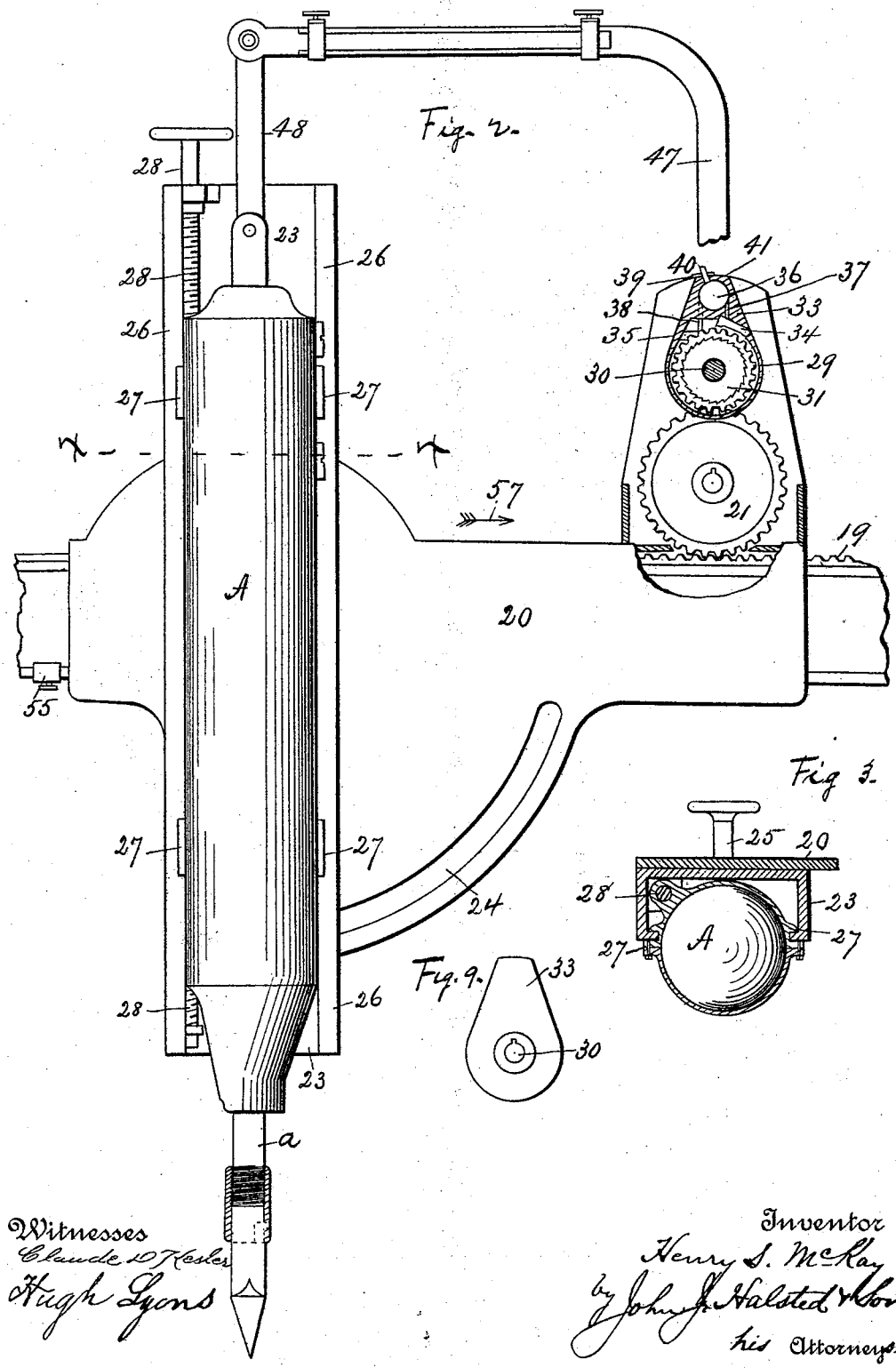

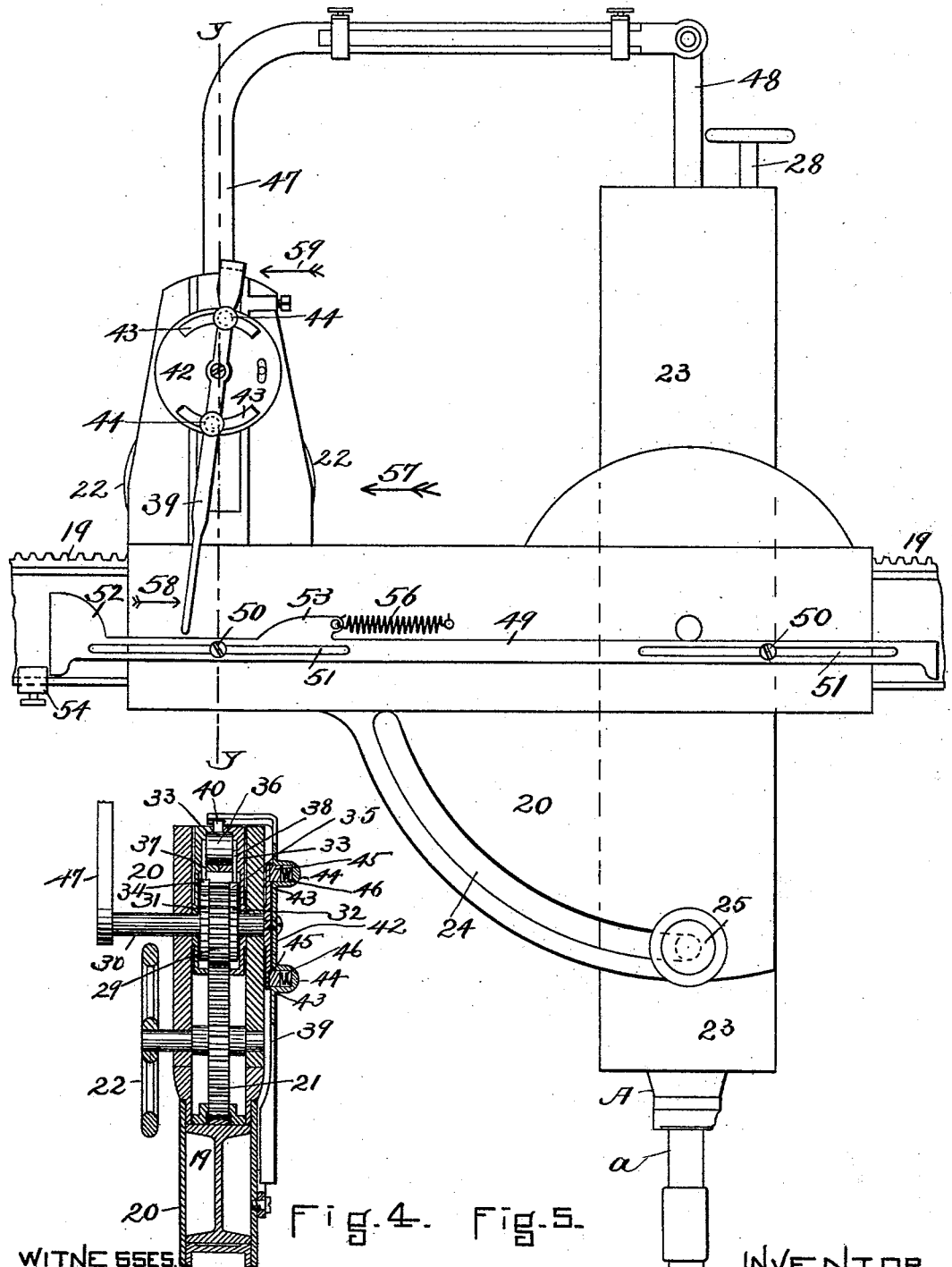

(No Model.) 4 Sheets—Sheet 4.
H. S. McKAY.
MEANS FOR GIVING RECIPROCATING OR OTHER MOTIONS.
No. 498,721. Patented May 30, 1893.

WITNESSES. INVENTOR.
Henry S. McKay
by John J. Halsted
his Attys.

United States Patent Office.

HENRY S. McKAY, OF BOSTON, MASSACHUSETTS.

MEANS FOR GIVING RECIPROCATING OR OTHER MOTIONS.

SPECIFICATION forming part of Letters Patent No. 498,721, dated May 30, 1893.

Application filed January 9, 1892. Serial No. 417,585. (No model.)

*To all whom it may concern:*

Be it known that I, HENRY S. McKAY, a citizen of the United States, residing at Boston, in the county of Suffolk and State of Massachusetts, have invented certain new and useful Improvements in Means for Transmitting Reciprocating or other Motions; and I do hereby declare the following to be a full, clear, and exact description of the invention, such as will enable others skilled in the art to which it appertains to make and use the same.

The object of my invention is to furnish means whereby the holder of a reciprocating tool, may have a motion at an angle with the stroke of the tool, which motion may be automatically given by the reciprocating action of the tool stock.

My invention also has for its objects certain improvements in the means of giving said reciprocating motion, and in certain details of construction; and also to furnish means whereby the tool and tool holder may be readily moved back and forth in any direction, and be made to assume any desired position.

Figure 1:
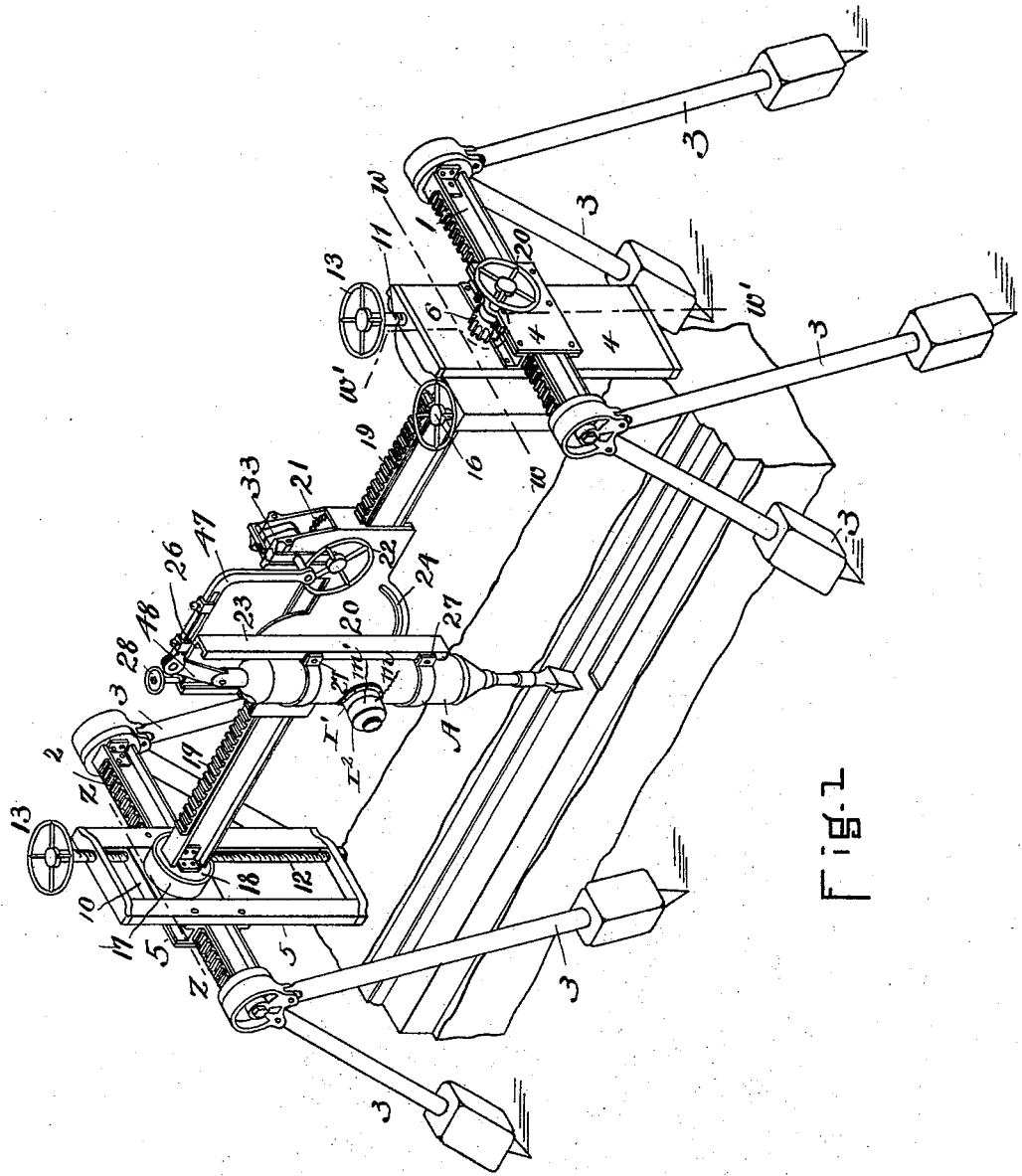
Figure 6:
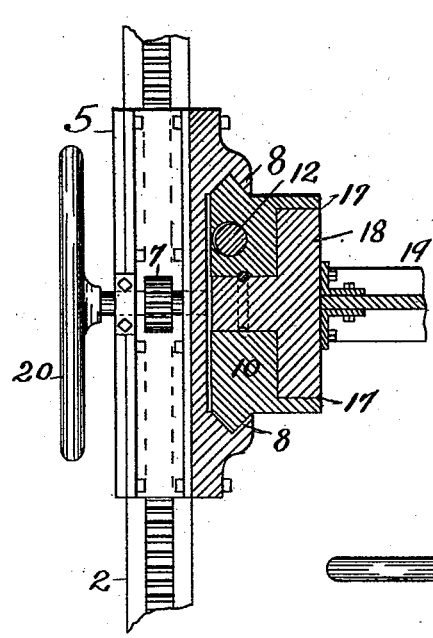
Figure 7:
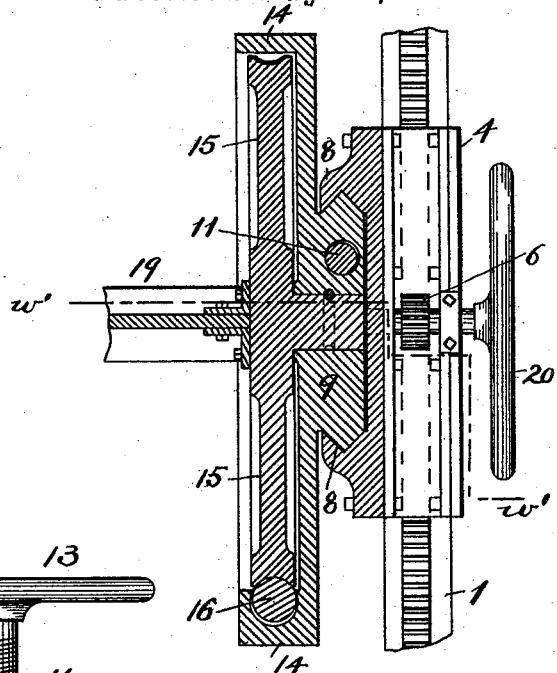
Figure 8:
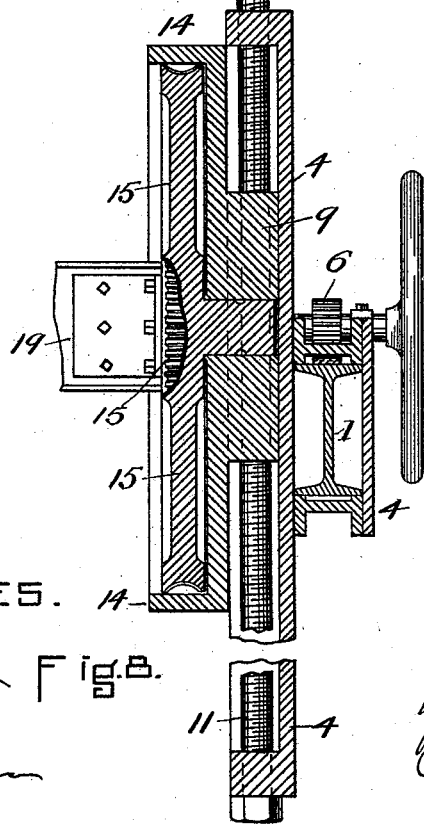

In the accompanying drawings:—Figure 1 is a perspective view of my invention as applied to a stone cutting or chiseling machine, and as cutting moldings or longitudinal recesses on a stone. Fig. 2, is a partial elevation, enlarged, of the frame or support for the tool holder, the means for moving the same on its support being shown in vertical section. Fig. 3 is a cross section on the line *x x* of Fig. 2. Fig. 4 is a section through the line *y y* of Fig. 5. Fig. 5 is a rear view of the parts shown in Fig. 2. Fig. 6 is a cross section enlarged through the line *z z* of Fig. 1. Fig. 7 is a cross section enlarged through the line *w w* of Fig. 1. Fig. 8 is a vertical section enlarged through the line *w' w'* of Figs. 1 and 7. Fig. 9 is a detail in elevation.

1 and 2 are two horizontal and parallel racks with the teeth of the same on their upper surfaces, and supported on standards or legs 3.

4 and 5 are two movable frames yoking or or partly surrounding the racks 1, 2, and supporting pinions 6, 7, which engage with and travel on the racks 1, 2. The inner portions of the frames 4 and 5 extend some distance both above and below the racks 1, 2, and are provided with vertical guideways 8, in which, blocks 9 and 10 are adapted to move respectively.

11 and 12 are screw threaded rods journaled in the upper and lower ends of the frames 4, 5, and extending up through the blocks 9, 10, and the upper portions of said frames, where they are provided with wheels or cranks 13, and said blocks are adapted to be raised and lowered by the rotation of said screw rods. The inner portion of the block 9 is provided with a circular frame or casing 14, in which a worm wheel 15 is adapted to rotate,—said wheel being journaled in said block, and prevented from displacement therein by an annular groove and pin. A worm 16 passing vertically through the frame 14 and provided with a handle on its upper end, engages with the wheel 15 and serves to rotate the same. The inner portion of the block 10 is provided with a circular socket 17, in which a disk 18, is adapted to rotate,—said disk being journaled in the block 10 and prevented from displacement therein by an annular groove and pin.

19 is a horizontal track having a rack upon its upper surface secured at one end to the worm wheel 15 and at the other end to the disk 17,—said track extending, therefore, between the two racks 1 and 2, and at right angles with the same.

The turning of the pinions 6 and 7 by their handles 20, serves to move the frames 4 and 5 and the blocks 9 and 10 along on the racks 1, 2, and also serves to move along the rack 19 laterally. The turning of the screw rods 11 and 12 serves to raise and lower the blocks 9 and 10 in their guide ways, and consequently to raise and lower the rack 19. The turning of the worm 16 serves to rotate the wheel 15, and consequently to turn the rack 19, which is secured to said wheel and the disk 17.

20 is a movable frame partly surrounding the rack 19, and to which frame are journaled two pinions, one only 21, being shown for engaging and riding over said rack. The pinion 21 is provided with a hand wheel 22 attached to its axle for turning said pinion and thus moving the frame 20 along said rack.

23 is a supplemental frame which is pivoted about midway of its length to the side of the frame 20. A curved slot 24 in the frame 20 in connection with an adjusting screw 25 passing through said slot and into the frame 23, serves as a means for inclining said frame and whatever it supports at any desired angle. The pivoted hanging frame 23, is provided with longitudinal guide ways 26 in which are adapted to slide corresponding lateral extensions 27, which are on the casing A of the reciprocating tool stock a. A threaded rod, 28, journaled at the upper and lower ends of the frame 23, and passing through a lateral extension of the tool casing A, serves to raise and lower said casing upon said frame.

29 is a pinion which is loosely hung upon a journal 30 in the frame 20 above the pinion 21, and which gears with said pinion; and 31 and 32 are two ratchet wheels supported upon the same axle as the pinion 21, and secured to opposite sides of the same, and with the teeth of one ratchet sloping in the opposite direction from the teeth of the other ratchet.

33 is a small split box or frame surrounding and inclosing the pinion 29, and ratchets 31 and 32, and secured to and supported by the journal 30 of said pinion and ratchets, so as to turn when said journal turns.

34 and 35 are two pawls pivoted above the ratchets 31 and 32 respectively, on opposite sides of the box 33, and are adapted to engage with said ratchets, at certain stages, to operate the same, and to prevent their turning in more than one direction.

36 is a small block or wheel inclosed in a circular socket in the upper part of the box 33, and above the ratchets 31 and 32; and 37, 38 are two links which are pivoted eccentrically at one end on opposite sides of the block 36—the opposite ends of said links being pivoted to the pawls 34 and 35, respectively. These links are pivoted in such positions to the wheel 36 that when said wheel is turned to engage one pawl with its ratchet, the other pawl is lifted out of engagement with its ratchet.

39 is a lever pivoted to the back of the frame 20 at a point opposite the end of the shaft 30, and extending over the top of the said frame and over the box 33, is attached to an upward projection 40 from the wheel 36.

The object of the lever 39 is to rotate the wheel 36 so as to bring one pawl into engagement with its ratchet, and to release the other pawl from its engagement, the movement of said wheel being limited by the length of the slot 41, through which the projection passes. That part of the frame 20 to which the lever 39 is pivoted is in the form of a circular plate 42. In the upper and lower portions of this plate 42, are two curved recesses 43 and opposite these recesses 43 and forming part of the lever 39, are two thimbles 44. Small circular blocks 45 are inserted in said thimbles, and are kept pressed into the recesses 43 by means of coiled springs 46. This construction serves to keep the lever 29 in any position that it may be placed,—the curved recesses 43 forming guides for the movements of the blocks 45.

47 is an elbow arm jointed and longitudinally adjustable, the downwardly extending portion of which is secured to the shaft 30 upon which the box 33 is keyed. The other extremity of the arm 47 is attached to the tool stock a by means of a link 48. By means of the above combination, at every upward movement of said stock, the downwardly extending portion of the arm 47, the shaft 30, and the box 33 will be slightly turned, thus also turning the pawl that is in engagement with its ratchet a slight distance,—say that of one tooth; the gear 29 will also be turned the same distance, and as said gear engages with the pinion 21, this pinion will also be rotated and in the opposite direction from that of the gear 32, and will move such slight distance along the rack 19, carrying the frames 20 and 23 and tool holder A along with it. It will thus be seen that at every upward movement of the tool stock, the tool holder will be moved a slight distance along the rack 19, and at right angles to the reciprocating movement of said stock. The pawl, which is in engagement with its ratchet, will prevent the rotation of the pinions 32 and 21 in the reverse direction.

49 is a bar which is attached to the back of the frame 20 longitudinally with the rack 19 by means of pins 50, passing from said frame through longitudinal slots, 51, in said bar. Each end of the bar 49 is squared or at right angles with its length. One of the slots 51 is situated under the lower end of the lever 39, and extending upward from the bar 49 on each side of the lever 39, are curved cam projections 52 and 53 respectively. 54 is a small adjustable block which is adjustably attached to the frame of the rack 19, beyond one end of the frame 20, a similar block (not shown) is attached to said rack frame beyond the other end of the frame 20 and which blocks may be fixed at any position longitudinally on said rack frame. These blocks, serve to limit the longitudinal movements of the slotted bar 49 (on its travel with the frame 20 and the tool holder A), by the square ends of said bar striking against said blocks. By means of the slots 51 and pins 50, the frame 20 and all of its supported parts, except the bar 49, will travel toward one of said blocks after the end of the bar 49 has struck the same; but said bar will then remain stationary, the pins 50 on said frame sliding in the slots 51. The frame 20 and other supported parts will continue to travel toward one of said blocks 54 until the lower end of the lever 49 strikes against the cam 52 nearest the block, when said lever will be pushed over by said cam so as to turn the wheel 36 and to raise the pawl, which, until then, had been engaged with its ratchet, from said engagement; and to bring the other pawl into engagement with its ratchet. When this operation takes place, the upward movement of the tool stock a causes the other ratchet to be turned and in the opposite direction, the pinion 32 is also turned in the opposite direction, from that just before given, and the tool holder A will be moved in the opposite direction on the rack 19. A coil spring 56, secured at one end to the frame 20, and at the other end to the outward end of the cam 53, serves to return the bar 49 to its normal position after having been drawn from the same.

In Figs. 2, 4, and 5, the pawl 35 is in engagement with its ratchet 32, and the carriage 20 and supported parts, including the tool casing, are moving in the direction of the arrow 57. When said frame and supported parts have moved until the end of the bar 49 next to the cam 52 has struck the block 54, said bar will be prevented from moving any farther in the direction of the arrow 57; but the other devices will continue to move in such direction until the lower end of the lever 39 strikes against the cam 52, when a continuation of said movement will cause said cam to slide the lever 39 in the direction of the arrows 58 and 59, when the wheel 36 will be turned, lifting the pawl 35 out of engagement with its ratchet 32, and dropping the pawl 34 into engagement with its ratchet 31, when the upward movement of the reciprocating tool stock $a$ will cause the frame 20 and its supported parts, including the tool holder A, to travel in the opposite direction from the arrow 57, as above stated. By releasing with one hand either or both of the pawls for engagement with either or both ratchets, the frame 20 and tool holder A may be moved to any position on the rack 19, by means of the hand wheel 22.

By means of the worm 16 and wheel 15, the rack 19 and everything supported upon the same, including the tool holder A, can be turned and adjusted sidewise to any desired angle.

The tool holder A can also be moved with its supporting rack 19 laterally, by means of the pinions 6, 7, and racks 1, 2, all as hereinbefore clearly described.

What I claim as new, and desire to secure by Letters Patent, is—

1. In combination with the tool holder, the horizontal rack 19, a pinion journaled on said holder engaging with and adapted to ride on said rack and thus to carry said tool holder along the rack, the two racks 1 and 2 and pinions supporting the rack 19, and engaging with racks 1 and 2, whereby the tool holder may be moved in planes parallel with said racks, all as set forth.

2. In combination with a reciprocating rod and its holder or support, the horizontal rack 19, a pinion sustained by said holder, an arm connected at one end by a link to the reciprocating rod, and its other end connected to a shaft which is sustained by said holder above the pinion 21, a pinion 29 loosely hung on said shaft, a ratchet secured to said pinion, a pawl pivoted to an arm extending from said shaft, and adapted to engage with said ratchet, whereby the movement of the reciprocating rod in one direction will cause the pawl to rotate the ratchet and move the holder along the rack, all as set forth.

3. In combination with a reciprocating rod and its holder, a carriage or frame supporting said holder, and provided with a pinion 21, a rack on which said pinion is adapted to engage and ride, an arm connected at one end by a link to the reciprocating rod, and its other end connected to a shaft which is journaled on said frame above the pinion 21, a pinion 29 loosely hung on said shaft, a ratchet secured to said pinion, a pawl pivoted to an arm extending from said shaft and adapted to engage with said ratchet, whereby the movement of the rod in one direction will cause the pawl to rotate the ratchet, and move the carriage and tool holder along the track, all as set forth.

4. In combination with a reciprocating rod and its holder, a carriage or frame supporting said holder and provided with a pinion 21, a rack on which said pinion is adapted to engage and ride, an arm connected at one end by a link to the reciprocating rod, and its other end connected to a shaft which is journaled on said frame above the pinion 21, a pinion 29 loosely mounted on said shaft, the ratchets 31, 32 secured to said pinion 29, the box 33 secured to said shaft, and pawls 34, 35 pivoted to said box, and adapted to engage with the ratchets 32, 31 respectively, with one of said pawls out of engagement with its ratchet, while the other pawl is in engagement with its ratchet, all as and for the purposes set forth.

5. In combination with a reciprocating rod and its holder or support, and said support provided with a pinion 21, a rack on which said pinion is adapted to engage and ride, an arm connected at one end by a link to the reciprocating rod, and at its other end connected to a shaft which is sustained by said holder above the pinion 21, a pinion 29 loosely mounted on said shaft, the ratchets 31, 32 secured to said pinion 29, the box 33 secured to said shaft, and pawls 34, 35 pivoted to said box, and adapted to engage with the ratchets 31, 32 respectively, with one of said pawls out of engagement with its ratchet, while the other pawl is in engagement with its ratchet, all as and for the purposes set forth.

6. In combination with a reciprocating rod and its holder or support, and said support provided with a pinion 21, a rack on which said pinion is adapted to engage and ride, an arm connected at one end by a link to the reciprocating rod, and its other end connected to a shaft 30, which is sustained by said holder above the pinion 21, a pinion 29 hung on said shaft and engaging with pinion 21, the ratchets 31, 32 secured to said pinion 29, a frame secured to said shaft 30, and pawls 34, 35 pivoted to said frame, and adapted to engage with the ratchets 31, 32 respectively, and means connecting the pawls 34, 35, with said carriage whereby one pawl will be lifted out of engagement with its ratchet while the other pawl is in engagement with its ratchet during the movement of the carriage in either direction, all as set forth.

7. In combination with a reciprocating rod and its holder or support, and said support provided with a pinion 21, a rack on which said pinion is adapted to engage and ride, an arm connected at one end by a link to the reciprocating rod, and its other end connected to a shaft 30 which is journaled on said frame above the pinion 21, a pinion 29 hung on said shaft and engaging with the pinion 21, the ratchets 31, 32 secured to said pinion 29 a frame secured to said shaft 30, and pawls 34, 35 pivoted to said frame and adapted to engage with the ratchets 31, 32 respectively, the block or wheel 36 having an upward projection extending beyond the top of said frame, and links 37, 38 connecting the pawls 34, 35 with said block, whereby one pawl will be lifted out of engagement with its ratchet, while the other pawl is in engagement with its ratchet, the lever 39, pivoted to the carriage and attached by its upper end to the upward projection of said block, and means for moving said lever to turn the block, and thus place one pawl or the other in engagement with its ratchet and at the same time release the other pawl from engagement with its ratchet, all as set forth.

8. In combination with the reciprocating rod and its holder the frame 20, lever 39 pivoted to said frame, disk or block 36 connected by a projection with the upper end of said lever, box 33 pivoted by a shaft 30 to the frame 20, pawls 34, 35, links 37, 38, ratchets 31, 32, pinions 29, 21, arm 47 secured to reciprocating rod and shaft 30, rack 19, sliding bar attached to the frame 20, and having the pawl shaped upward extensions 52, 53, and the adjustable stops on the rack 19, all combined and adapted to operate as set forth.

In testimony whereof I affix my signature in presence of two witnesses.

HENRY S. McKAY.

Witnesses:
JOHN MURRAY MARSHALL,
PENNINGTON HALSTED.